United States Patent [19]

Foster et al.

[11] Patent Number: 4,750,983
[45] Date of Patent: Jun. 14, 1988

[54] FLUID SEPARATION CELLS AND SPACERS FOR USE IN THESE

[75] Inventors: Paul A. Foster, Herts.; Errol M. Stolberg, Middx., both of United Kingdom

[73] Assignee: The Permutit Company Limited, Great Britain

[21] Appl. No.: 834,309
[22] PCT Filed: Jun. 17, 1985
[86] PCT No.: PCT/GB85/00270
§ 371 Date: May 7, 1986
§ 102(e) Date: May 7, 1986
[87] PCT Pub. No.: WO86/00237
PCT Pub. Date: Jan. 16, 1986

[30] Foreign Application Priority Data

Jun. 18, 1984 [GB] United Kingdom ............ 8415463
Mar. 27, 1985 [GB] United Kingdom ............ 8507945

[51] Int. Cl.⁴ .................. B01D 13/02; B01D 13/00
[52] U.S. Cl. ......................... 204/301; 204/182.3; 210/321.75
[58] Field of Search ............ 204/301, 279, 255, 257, 204/182.3, 182.4, 182.5, 182.6; 210/321.1, 321.3, 321.2, 321.4

[56] References Cited

U.S. PATENT DOCUMENTS 3,459,310 8/1969 Edwards ..................... 210/321.3
3,703,466 11/1972 LaForest et al. ............. 210/321.3
4,124,478 11/1978 Tsien et al. .................. 204/279 X
4,339,324 7/1982 Hass ........................... 204/257 X

FOREIGN PATENT DOCUMENTS

24538 2/1980 Japan ......................... 204/301
1013464 12/1965 United Kingdom .
1439876 6/1976 United Kingdom .

Primary Examiner—John F. Niebling
Assistant Examiner—John S. Starsiak, Jr.
Attorney, Agent, or Firm—Sughrue, Mion, Zinn, Macpeak, and Seas

[57] ABSTRACT

A spacer sheet for use together with another spacer sheet between adjacent membranes (17) in a fluid separation cell, for example an electroldilysis cell, has an open center (2), conduit passages (8 and 9) for the supply and withdrawal of fluid to the chamber formed by the open center (2) between the membranes (17), and slots consisting of an offset slot stem (13) and a narrow mouth (14) opening into either the open center (2) or the conduit passages (8 or 9). The slots of the 2 sheets of a spacer assembly cooperate to provide a passage for fluid between the conduit passage and the open center. Identical spacer assemblies may be used between membranes in adjacent cell pairs by positioning the mutually perpendicular. The new spacers are suitable for use in an electrodialysis cell for use in a new method in which ions are removed from a liquid mixture comprising water and water-miscible organic liquid. The deionized liqiud is concentrated and used dowhole, for example in the recovery of methane.

23 Claims, 4 Drawing Sheets

FLUID SEPARATION CELLS AND SPACERS FOR USE IN THESE

A fluid separation cell, for instance for reverse osmosis, ultrafiltration, dialysis or, particularly, electrodialysis comprises a stack of shallow chambers, each chamber being defined on its opposing faces by a membrane that separates it from the next chamber and around its sides by a spacer assembly. A different fluid flows across each adjacent chamber with transfer of impurities across the separating membrane from the fluid (the diluate) in one chamber to the fluid (the concentrate) in the adjacent chamber. For instance the diluate may be water contaminated with salts and that is to be purified by passage through one chamber whilst the concentrate may be brackish, sea or other water that is to receive impurities across the membrane from the diluate in the adjacent chamber.

Passages for the supply and withdrawal of diluate to one set of chambers and concentrate to another set of chambers must be provided through the spacer assembly and the membranes and so the spacer assembly and the membranes contain appropriate co-operating supply and withdrawal conduits. Each spacer has an open centre that will define the area of the fluid chamber and conduit passages for supply and withdrawal of fluid.

Suitable transfer means must be provided to permit the transfer of fluid from an appropriate supply or withdrawal conduit into a chamber. These transfer means take the form of slots, holes or other passages extending between the conduits and the open centre of a chamber.

A serious problem with fluid separation cells of this type is that if there is leakage of fluid containing impurities (the concentrate) into fluid that has been or is being purified (the diluate) the degree of purification that is obtainable will be greatly reduced. It is therefore essential to minimise or eliminate unwanted leakage between adjacent chambers and between the supply or withdrawal conduits and the chambers, except through the desired transfer means. The spacers and the membranes must therefore stack together in such a manner as to prevent leakage. Unfortunately this has not previously been easily achieved and as a result it has seriously restricted the value of processes such as electrodialysis. One fundamental difficulty is that if a groove or other transfer means extends in the surface of a spacer between a supply or withdrawal passage and the open centre there will be a serious tendency for the adjacent membrane and adjacent spacer assembly to bow into that groove, thus permitting leakage.

A particular problem arises in dialysis, especially electrodialysis because of the need to maintain a constant high flow rate and a flow rate that is uniform across each chamber. If the flow rate is not uniform the concentration of impurity ions in the areas of the concentrate cell where the flow rate is low will become excessive, and this will lead to precipitation of impurity salts within the shallow chamber. Once precipitation occurs to any significant extent the cell tends to become inoperable.

A simple type of spacer assembly that has been tested in electrodialysis cells is a uniform mesh of plastics material extending throughout the cell, thus separating the membranes throughout their area, optionally with a rigid flat bar on each side of the mesh around it edges with the intention that the flexible membrane would form a tight seal with the bar. However this is not very effective, the assembly of the spacers is difficult and expensive and leakage remains a problem.

In U.S. Pat. No. 3,256,174 a single spacer is used in each chamber and the spacer frame has holes drilled from the supply passages to the open centre or has grooves formed in one layer of the spacer and covered with an overlying laminate. However this system is expensive and requires a thick spacer which results in less efficient separation within the chamber. Also the fluids are not supplied and withdrawn uniformly to the entire width of each chamber and so precipitation in the concentrate chamber is a danger.

In GB No. 921094 and FR No. 1281549 there is again a single spacer provided with transfer means extending between the open centre and the supply or withdrawal passage, the transfer means being a slot having a least one bend to reduce the ability of the membrane to bow into the slot. An alternative solution disclosed is to provide a porous compressible spacer within the slot which provides support for a membrane but allows passage of water though the slot. Such spacers are however difficult to make and would result in an extremely high pressure drop between the supply conduits and the chamber between the membranes. Again the supply of fluid is not very uniform and quiescent zones in which precipitation may occur are likely to exist.

In GB No. 1447174 and DE No. 2418369 various combinations of spacers and membranes are proposed and again the transfer means consist of passages extending between the supply or withdrawal conduits and the open centre.

If such a spacer is used alone between a pair of membranes the membrane may bow into the slots to result in leakage between the supply conduits and an adjacent chamber. The specification discloses the use of such a frame together with a former on both sides of the spacer which is rigid enough such that it does not bow into the slots and which provides a continuous flat bar in contact with the membrane between the fluid supply conduits and the open centre. The system disclosed requires the use of at least two different types of spacer and must have at least three spacers between each pair of membranes thus making the separation chamber undesirably deep.

In U.S. Pat. No. 3,703,466 and FR No. 2070975 pairs of spacers are used between each pair of membranes. The transfer means are provided by slots that each lead partway only between one of the conduit passages and the open centre, the slots co-operating over an area between the conduit passage and the open centre to form a continuous fluid passage. Although this potentially reduces some of the leakage problems, in that it is possible to arrange for the membrane on each side of the spacer pair to be in contact around its periphery with a continuous solid surface, the construction shown in U.S. Pat. No. 3,703,466 still gives serious problems, especially when used for high flow rate dialysis. The conduit passages consist of relatively small holes generally arranged in the corners of the spacer and the slots extending partway between these corner passages and the open centre necessarily have to be very few in number and of small dimensions. Accordingly there will be very high pressure drop if such a cell is operated at high flow rates and there will be a serious risk of quiescent zones in the concentrate chambers. Another difficulty with the construction shown in U.S. Pat. No. 3,703,466 is that it is essential to provide two different types of spacer sheet in each chamber.

Various combinations of spacer sheets are shown in FR No. 1603631 but again the conduit passages are only at the corners and the pressure drop in this arrangement would be even worse since a circular conduit passage leads through a very narrow orifice to an elongated passage that co-operates with narrow slots in an adjacent spacer. Again therefore there would be serious pressure drop and serious precipitation problems due to quiescent zones.

In GB No. 1013464 a pair of co-operating spacers are used to define each chamber. One of the spacer sheets has slots from the conduit passages directed towards but reaching part way only to the open centre and the other sheet has slots from the open centre directed towards but reaching part way only to the conduit passage. The slots in one sheet overlap with the slots in the other sheet so that there is a continuous channel from the conduit passage to the chamber. The slots illustrated in the patent specification are very wide, with only about 6 along each side of a sheet. Again therefore there is a serious risk of quiescent zones and, in particular, the width of the slots is so large that even if the sheets are formed of fairly rigid material they distort into the slots sufficient to allow leakage. Probably because of this, the type of assembly shown in this patent has not been adopted commercially. Similar difficulties also apply to the spacer assemblies shown in GB No. 1439876.

There is therefore a serious need to provide spacer assemblies that will permit the construction of dialysis, electrodialysis and other fluid separation cells wherein the leakage problems of the prior art are reduced or eliminated and high and uniform flow rates can be achieved without incurring high and unacceptable pressure drops.

A spacer assembly according to the invention suitable to separate the membranes of a fluid chamber in a fluid separation cell comprises a pair of spacer sheets and each spacer sheet has an open centre that will define the area of the fluid chamber, conduit passages for supply and withdrawal of fluid to that cell and a plurality of slots each leading part way only between one of the conduit passages and the open centre and each having a slot mouth that opens into either the open centre or that conduit passage and that leads into a closed slot stem and the slots co-operate so that the slots in one sheet which have their mouths opening into the open centre co-operate with the slots in the other sheet having their mouths opening into the conduit holes to provide a continuous fluid passage between the conduit holes and the open centre, and is characterised in that the conduit passages consist of a supply conduit passage and a withdrawal conduit passage extending along opposites sides of the spacer sheet along substantially the entire width of the open centre, the slots are distributed substantially uniformly across the width of each conduit passage, and at least some of the slots are offset slots each of which has a stem which includes a portion that is offset in at least one transverse direction with respect to the mouth and substantially all of the slots which are not offset slots in one sheet co-operate with an offset slot in the other sheet.

Thus it is essential in the invention that each pair of co-operating slots, that together form a slot extending between the open centre and the conduit passage, should include at least one offset slot. It is possible for all the slots in one sheet to be offset slots and none of the slots in the other to be offset but it is generally preferred that some at least of the slots in each sheet should be offset slots. Individual spacer sheets as defined above wherein at least some of the slots are offset slots form a further part of the invention. Generally at least 10%, preferably at least 30% and most usually at least 50% of the slots in such a sheet are offset slots.

The slots are arranged along the conduit passages of both sheets so that substantially every slot having no offset portion co-operates with an offset slot. For instance, the slots in both sheets may be arranged in blocks of each type of slot or slots with and without offset portions may alternate along the conduit passage. Preferably most or all of the slots are offset slots.

In the invention the slots along one conduit passage may include some whose mouths open into the open centre and others whose mouths open into the conduit passage for example arranged in blocks of each type. Preferably, however the conduit passages are each selected from type 1 conduit passages and type 2 conduit passages. The slots distributed along a type 1 conduit passages all have their mouths opening into the conduit passage and the slots distributed along a type 2 conduit passage all have their mouths opening into the open centre. In a spacer assembly comprising these preferred sheets a type 1 conduit passage in one sheet cooperates with a type 2 conduit passage in the other sheet. Conveniently each spacer sheet has one type 1 conduit passage and one type 2 conduit passage, so that two substantially identical sheets may be used as a spacer assembly.

In the system described in British Patent Specification No. 1,013,464 the mouth of the slot and the closed slot stem were of uniform width, the slot being rectangular. If the width of the slot is reduced this reduces the risk of the other sheet distorting into the slot, and permitting leakage. Unfortunately even with guide holes through the spacer sheets to carry bolts or other fasteners it is difficult to position the spacer sheets accurately throughout the fluid separation cell and reduction in the width of the slots increases the difficulty. Accordingly simple reduction of the width of the slots shown in GB No. 1,013,464 does not lead to a useful product since the slots in practice tend to be misaligned to such an extent that they do not cooperate effectively to provide the necessary continuous passages for the flow of liquid between the fluid conduits and the fluid chamber. Misalignment blocks the slots and prevents flow completely, or reduces their dimensions so as to cause an undesirable increase in pressure drop.

The invention can be used in ultrafiltration conducted at relatively low pressures, for instance below 10 bar but is of particular value in dialysis and electrodialysis apparatus and for the first time overcomes the problems of the prior art.

By providing conduit passages along substantially the entire width of the open space and by providing slots substantially uniformly along the conduit passage uniform flow through each chamber can be achieved, thereby minimising the risk of unwanted precipitation within a chamber. As a result of either or both slots of each co-operating pair being offset slots it is easily possible to obtain effective registration of the slots even though the slot mouths are very narrow. Pressure drop is not a serious problem, even though the slot mouths are narrow, because slots are provided substantially uniformly along the entire width of the chamber. Leakage is prevented because the mouths are sufficiently narrow that there is substantially no risk of adjacent spacer sheets bowing into the mouth of a slot and because each membrane is supported around its edges on both faces by a continuous web of spacer sheet material.

As a result of the invention it is possible to obtain much greater degrees of purification than have previously been obtainable. For instance when the diluate water initially has a concentration of, say, 30,000 ppm dissolved salts it has in practice been difficult or impossible to obtain a final diluate concentration of below about 1,500 ppm by convenient electrodialysis methods, but in the invention it is easily possible to obtain diluate concentrations of below 300 ppm, for instance as low as 30 ppm. Thus by the invention it is easily possible to reduce the concentration of impurities by dialysis or electrodialysis by a factor of at least 50, usually at least 100 and often at least 500, for instance up to 1,000 or even 2,000.

The purpose of making the closed slot stem include a portion that is offset in at least one transverse direction with respect to the mouth of that stem is such that that slot can move transverse to the cooperating slot, while still providing a continuous passage, by a greater amount than if the stem of each slot was rectangular and of the same width as its mouth. Generally each slot is offset in both its transverse directions with respect to the mouth, the slot being, for instance, triangular, T-shaped or key-hole shaped. However satisfactory results can be achieved if the slot is offset in only one transverse direction, for instance being L-shaped or simply cut at an angle of less than 90% to the edge of the conduit passage or the open centre as the case may be. If co-operating slots in a spacer assembly are offset in one direction only then the slots should be offset in opposite directions in co-operating sheets.

Generally the offset portion of the slot stem is offset with respect to the mouth as a result of being wider than the mouth. This arrangement not only has the advantages mentioned above in connection with the misalignment of slots, but also results in a lower pressure drop along the fluid passage formed by the cooperating slots even with perfect alignment of slots, than with sheets having rectangular slots. Preferably the width of the offset portion of the slot stem is wider than the width of the web of sheet material between the offset portions, since then a continuous fluid passage will inevitably be formed irrespective of the transverse positioning of the spacer sheets with respect to one another. Preferably the maximum width of the slot stem is 1.2 to 5 times the width of the slot mouth, generally 1.5 to 3 times the width of the slot mouth. The mouth of each slot is usually from 0.5 to 5 mm wide, preferably from 1 to 3 mm. The slots are usually 2 to 10 mm wide in the stem region where overlap of slots occurs, preferably from 3 to 5 mm.

Although the width of the web material between the stem portions is preferably less than the width of each stem portion it must not be too narrow as otherwise the sheet may be weakened and the teeth defined by adjacent slots may break during handling of the spacer sheets. Preferably it is at least 1.5 mm and usually more than 2.5 mm.

The spacer sheets are suitably made from a thin flexible sheet material, for example a plastics material, for example polyvinyl chloride or polyolefins, such as homo- or co-polymers of ethylene and propylene. Preferably the spacer sheet is formed of polypropylene. The sheets generally have a thickness in the range of from 0.2 to 3 mm, preferably in the range of from 0.5 to 1.5 mm. The resistance of the sheet to bending and bowing into a slot is dependant to some extent upon the ratio of its thickness to the width of the slot. Usually the ratio of the thickness of the spacer sheet to the width of the slot mouth is the range 1:5 to 5:1, preferably 1:2 to 1:0.3.

The conduit passages for supply and withdrawal of fluid to and from the open centre are along opposite sides of the spacer sheet. Each passage may conveniently comprise one or more substantially rectangular holes in the spacer sheet, generally across substantially the entire width of the open centre. The slots are distributed preferably substantially uniformly along each conduit passage and, for best results, the spacing of the slots in the two spacer sheets forming a spacer assembly is substantially the same. Some degree of non-uniformity, for example in the size of the slots or their spacing, may be tolerated provided it does not result in seriously non-uniform flow across the cell. The slots are distributed across substantially the whole width of the conduit passage and of the open centre in order that, in a cell containing a spacer assembly, there is substantially uniform flow across the whole width of the chamber defined by the open centres. In electrodialysis cells in particular it is necessary to maintain flow across the whole area of the membrane at all times since, in the absence of flow high concentrations of ions develop at the membrane surface which may result in, for instance pH changes and the precipitation of salts, which is most undesirable. Maintaining uniform flow across the membranes also tends to increase the efficiency of transfer of species through the membrane.

The spacer sheets conveniently are polygonal having an even number of sides, for example rectangular, and are preferably regular polygonal, for example hexagonal or most suitably square. Conduit passage on opposite sides of the polygon from parts of the supply and withdrawal channels for a first fluid passing though the cell. Square spacer sheets according to the invention preferably are provided with side passages in the sides not having conduit passages, of substantially the same dimensions and positions as the conduit passages, between the open centre and the outside edge of the spacer. These side passages may, for instance form part of supply and withdrawal channels for a second fluid in the cell. Identical spacer assemblies may be used in adjacent fluid chambers, though which different fluids are flowing at right angles to each other, and in such a cell the spacers are oriented at 90° relative to each other. The side passages in one spacer assembly thus, together with the conduit passages of the other spacer, form part of the supply and withdrawal passages for fluid passing into the chamber formed by the open centre of the latter spacer assembly. In a similar manner identical hexagonal spacer assemblies having conduit passages in two opposite sides and side passages in each of the other four sides, may be used in a fluid separation cell having three separate streams, the spacer assemblies being oriented at 60° relative to the spacers between adjacent membranes.

In the preferred spacer assembly, in which each spacer sheet is substantially identical, the arrangement of the slots must be such that, when one the sheet is turned over and/or rotated thought 180% relative to the identical sheet, slots having their mouth opening into the conduit passages in one sheet cooperate with slots having their mouths opening into the open centre in the other sheet.

The open centre of each sheet may be completely open or may include baffles constructed to cause fluid to follow a non-linear path between the inlet conduit and the outlet conduit.

Each spacer assembly, and indeed the entire fluid separation cell, is preferably releasably held together by compression, and there is no requirement for fixing with glue or mastick. A stack may be held together by bolts passing through holes in spacers and membranes, or by plates at each end of the stack which are bolted together.

A conventional mesh spacer may be located in each chamber between the pair of membranes. In some systems there may be ion exchange resin particles or fibres, or other particles or fibres, in the chambers. In that case it may be convenient to prevent the passage of particles out of the chamber by including a layer of gauze between the two sheets forming a spacer to block the channels.

The invention is particularly useful in cells for electrodialysis but is also of value in dialysis, for example blood dialysis, ultrafiltration especially low pressure ultrafiltration and cross flow microfiltration. Leakage can be avoided even when there are large pressure differences, eg up to 3.5 bar, between adjacent chambers.

The diluate and concentrate liquids used in the invention can be any of the liquids conventionally used in such processes. When the process is electrodialysis the diluate and concentrate are generally both aqueous, the diluate often being water contaminated with dissolved salts and the concentrate often being impure water, for instance sea water.

There are various situations in which it is desirable to remove ions that are dissolved into a mixture of water and a water miscible organic liquid. For instance various fluids are pumped down subterranean wells at various stages in the recovery of hydrocarbons, such as gas and oil. Often these fluids contain active ingredients which are highly expensive and which it is therefore desirable to recycle. When the fluids are recovered from a well, for instance an undersea well, they may be diluted by water, usually sea water. Before recycling the fluids it is therefore necessary to remove the water to maintain the concentration of the components of the fluid. If the contaminant is sea water, removal by distillation or other evaporation procedures is likely to result in the formation of deposits of salt. It is therefore necessary to remove the dissolved salts before the evaporation, and to do this in a way that does not damage the other components of the fluid.

Particular problems arise when methane and other very volatile hydrocarbons are to be collected since if water leaks into a compressed stream of methane there is the risk of forming solid methane hydrate deposits with possible consequential blockage of valves. It is therefore necessary to inject some water miscible liquid, possibly methanol but generally ethylene glycol, into the stream to take up any water leakage and prevent the formation of these deposits. However, it has been economically difficult, especially on oil and gas rigs at sea, to maintain the concentration of organic liquid for reuse, because of the difficulties of concentration. As a result it is often preferred to shut down a gas well, as soon as leakage of sea water into it occurs, rather than to try to control it by the addition of ethylene glycol followed by concentration of the resultant aqueous ethylene glycol mixture.

We have now surprisingly found that electrodialysis can be used to remove dissolved ions from a mixture of water and a water miscible liquid. The electrodialysis can be conducted using known electrodialysis cells but preferably is conducted using an electrodialysis cell according to the invention, as described above. By this means it is easily possible to reduce the salt concentration from, for instance above 20,000 ppm to a value of less than 500 ppm, so as to avoid caking up of evaporation apparatus.

In a preferred method the deionised liquid is concentrated by the removal of at least some of the water and the resulting concentrate of water-miscible organic liquid is pumped down a subterranean well. Water is generally removed from the deionised liquid by flash evaporation.

The water-miscible organic liquid is preferably one that is resistant and inert to ions, especially sodium and chloride ions. Suitable organic liquids are glycols, particularly monoethylene glycol.

The aqueous mixture may contain various components for particular applications downhole. The process is particularly useful in the recycling of water-glycol mixtures used as protective solutions for downhole tools and in gas recovery. The solutions become diluted with sea water downhole and are deionised before water is removed by flash evaporation to give mixtures of the desired concentration. For instance the process of the invention may be used to remove sodium chloride from a 50—50 mixture of glycol and water by weight which contains up to 5% sodium chloride. The resultant deionised glycol solution may be concentrated to for instance a 70-30% by weight mixture of glycol and water and used in the recovery of gas.

The electrodialysis cell will generally have two input streams, one of which is the aqueous organic dilute to be deionised and the other of which comprises water or sea water concentrate. The ions are transferred across the electrodialysis membranes from the aqueous organic solution into the water or sea water. The membranes are usually substantially impermeable and inert to the non-ionic components of the mixture, i.e., to the organic components. Often it may improve the efficiency of deionisation to recirculate of least part of the cell output to the input so that the liquid passes through the cell more than once.

Since the solutions are generally recovered from the well and recycled any gas or other hydrocarbons that the solutions accumulate from the well may be separated from the solution before it is returned to the well. This separation may be carried out after the electrodialysis step but is usually carried out before the solution is passed through the electrodialysis cell. For example gas and/or light hydrocarbons may be distilled from the solutions recovered from a well by a glycol water mixture.

The invention is illustrated in the accompanying drawings in which.

Figure 1:
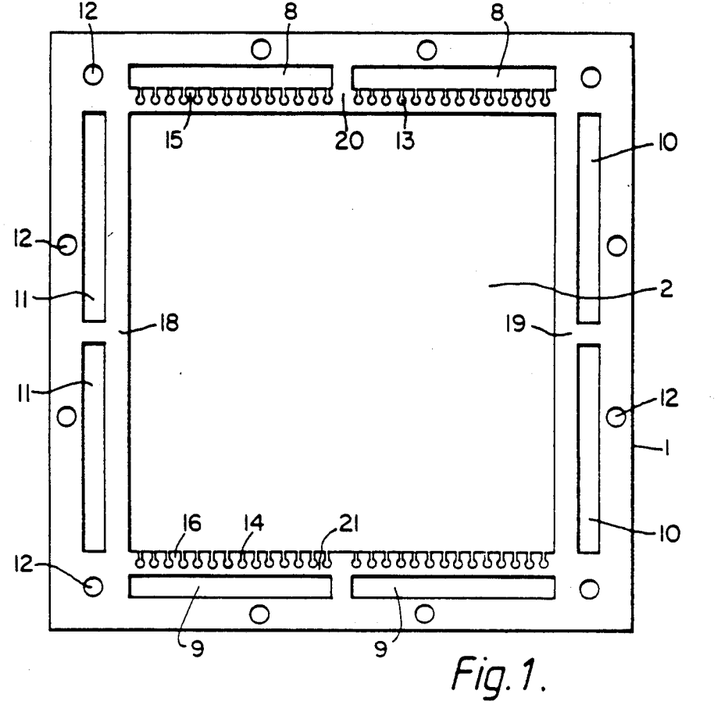
FIG. 1 shows a spacer sheet.

One of a pair of identical spacer sheets 1 used to make a spacer assembly has an open centre 2, conduit passages each formed by two rectangular holes 8 and 9, side passages each formed by two holes 10 and 11, holes 12 for retaining bolts and sets of slots 13 and 14 (not to scale). The conduit passage formed by holes 8 is a type 1 conduit passage, as defined above, and the conduit formed by holes 9 is a type 2 conduit passage.

The illustrated slots 13 and 14 each have a narrow mouth 30 opening into either a conduit hole 8 and 9 or the open centre 2 and has a stem 31 including an enlarged portion 32. The lateral parts 33 and 34 of this enlarged portion are each offset laterally with respect to the mouth 30. The sheet material between the slots 13 is in the form of teeth 15 that merge, at the closed ends of the slots stems, into a continuous web 20 whilst the sheet material between the slots 14 is in the form of teeth 16 that merges, behind the closed stems of the slots 14, into a continuous web 21. Continuous webs 18 and 19 separate the open centre 2 from the side passages formed by holes 10 and 11.

Two sheets 1, rotated through 180° relative to one another, form a spacer assembly. In a cell a membrane 17 is positioned on each side of the spacer assembly, and the open centres 2 of the spacer sheets create a chamber bounded by two membranes 17, the webs 18 and 19 along two opposite sides of the spacer and the webs 20 and 21 on the other two sides of the spacer.

Figure 2:
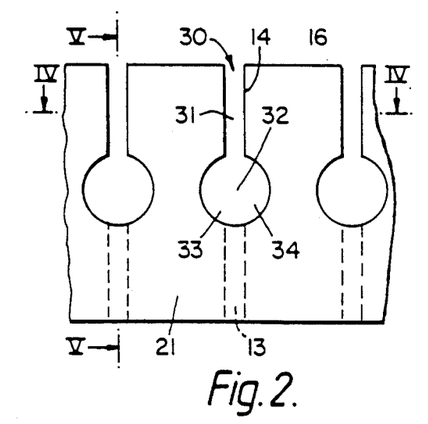
FIG. 2 shows an enlarged view of the slots forming the channels in a spacer assembly in which the two sheets are aligned.

The key-hole shaped slots 13 and 14 coincide along each web 20 and 21, overlapping in the region of their enlarged stems 32 along the longitudinal centre of the webs 20 and 21. Each pair of overlapping slots 13 and 14 form a continuous channel, indicated by arrow 23, between a conduit hole 8 or 9 and the chamber formed by the open centres 2 of the spacer sheets 1.

Figure 3:
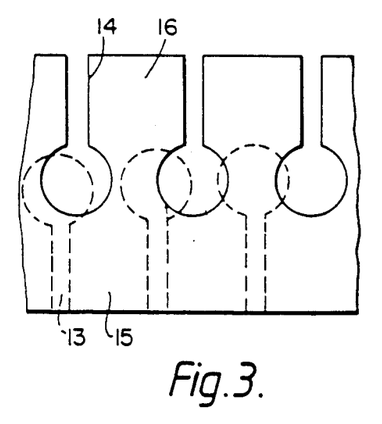
FIG. 3 shows an enlarged view of the slots forming the channels in a spacer assembly in which the two sheets are misaligned.

When the sheets 1 are correctly aligned, as shown in FIG. 2, the enlarged stem portions 32 of the slots 13 and 14 coincide exactly, to form the broadest possible channels 23. When the sheets 1 are misaligned, as shown in FIG. 3, the slots 14 coincide with the teeth 15 between the slots 13, and the slots 13 coincide with the teeth 16 between the slots 14. However since the diameter of the enlarged stem portions 32 is greater than the width of the teeth at their narrowest points, the slots still form continuous channels to and from the chamber.

Figure 4:
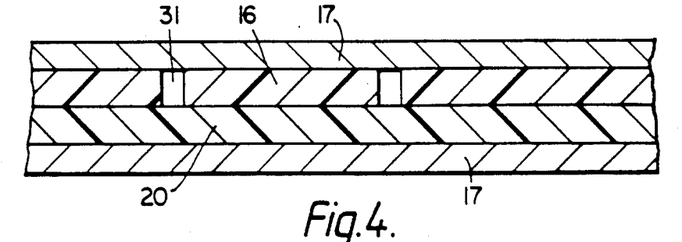
FIG. 4 is a cross-section along line IV—IV of FIG. 2 of a chamber including the spacer assembly and the membranes.

In a cell stack pairs of spacers alternate with the membranes. As shown in FIG. 4 the membranes 17 are held apart at their edges by the spacer sheets and because of the relatively narrow width of the mouths 31 of the slots there is substantially no risk of distortion of adjacent spacer sheets into the slots. As a result of compressing the edges of the stack by retaining bolts in the holes 12 each face of each membrane is in contact with a continuous web of undistorted spacer sheet around the entire open centre of a spacer assembly and also around all conduit passages and side passages, to eliminate or minimise leakage between fluid streams.

The spacers illustrated are for use in a two-stream system, as described in British Patent Specification No. 845,186, in which one stream flows through alternate chambers between membranes and the other stream flows through the other chambers, and in which the streams flow in mutually perpendicular directions. An example of such an arrangement is illustrated in the exploded view shown in FIG. 7 of one of the assemblies that is repeated to form a complete stack.

Figure 7:
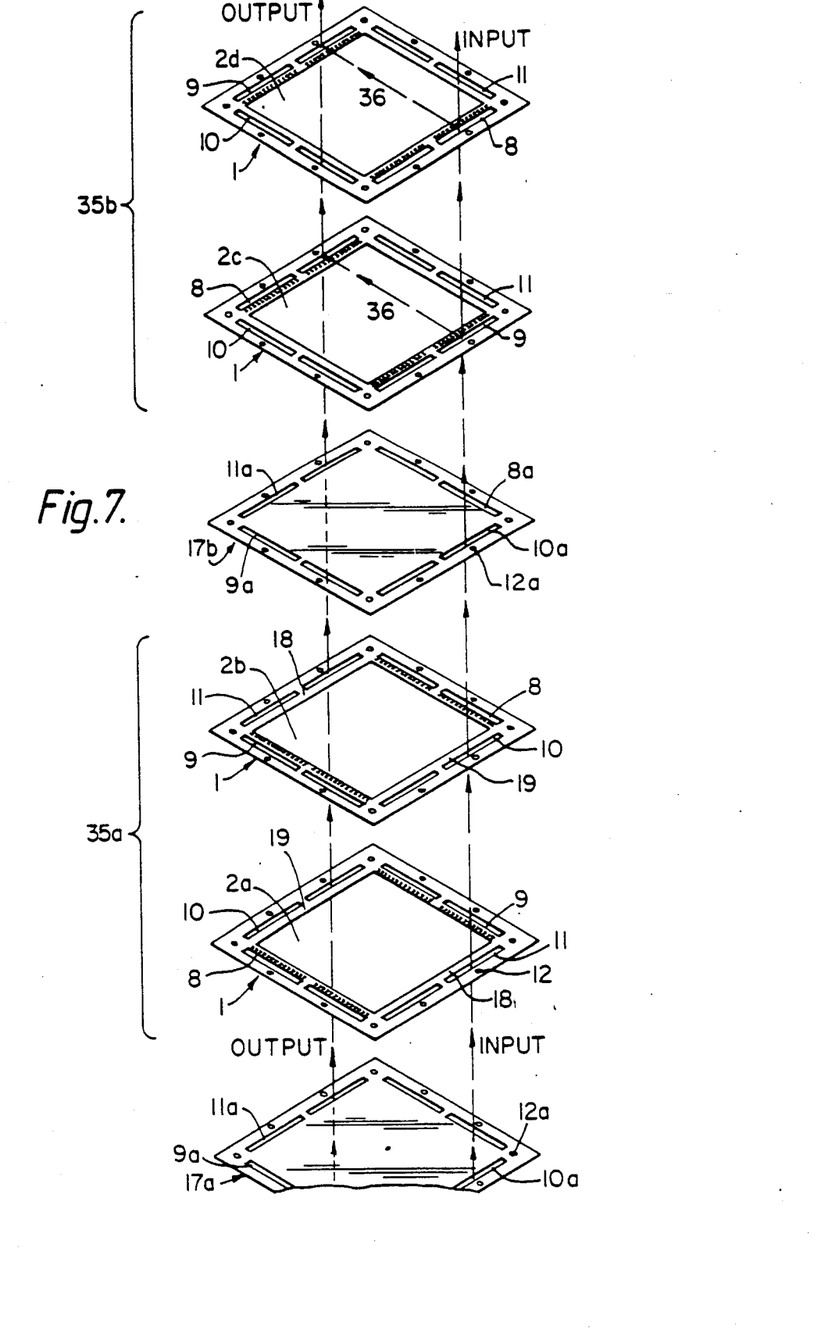
FIG. 7 shows an exploded view of part of a cell assembly for two feeds streams flowing at right angles to each other using the spacer sheets shown in FIG. 1 and the membrane show in FIG. 6.

Between each pair of membranes 17 is a spacer assembly 35a, 35b, each comprising two spacer sheets 1. The two spacer sheets in a spacer assembly are identical and one of the sheets is rotated by 180° about an axis perpendicular to and passing through the centre of its plane with respect to the other sheet or is alternatively rotated by 180° about an axis parallel to and mid way between the input and output conduit passages formed by holes 8 and 9 with respect to the other sheet. The spacer assemblies in adjacent chambers 35a and 35b are identical to each other but are rotated through an angle of 90° about an axis perpendicular to and passing through the centres of their plane relative to one another. Generally there is a sheet of mesh disposed within the chamber formed by the open centres 2 of the spacer sheets of a spacer assembly, but this has been omitted from the figure for clarity.

Figure 6:
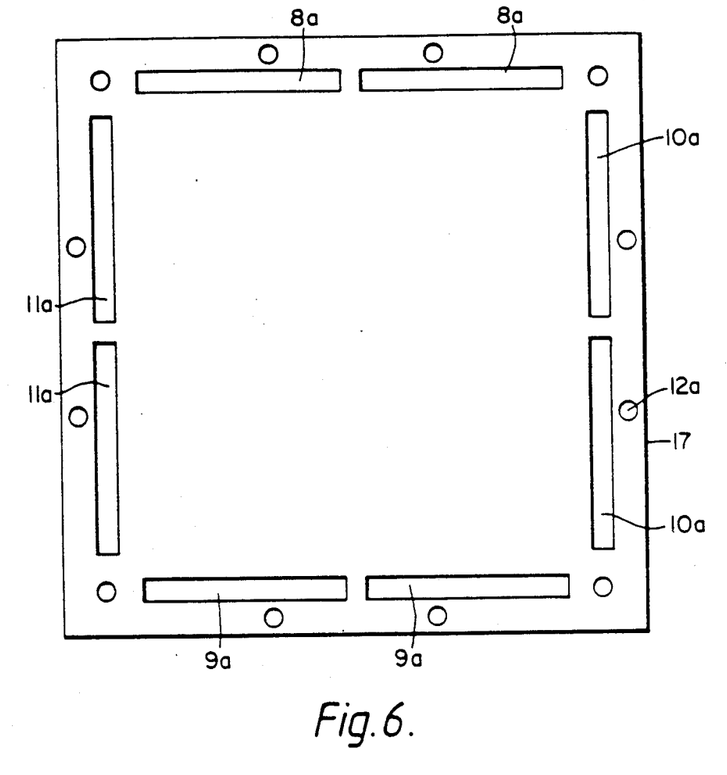
FIG. 6 is a membrane for use with the spacer shown in FIG. 1.

The membranes 17 between each pair of spacer assemblies are identical to one another and, as shown in FIG. 6, have passages formed by holes 8a to 11a and bolt holes 12a which coincide with holes 8 to 11 and bolt holes 12 respectively in adjacent spacer sheets.

For clarity FIG. 7 show the direction of flow of one only of the streams through the cell. The input conduit is formed by (in sequence from the bottom) the membrane side passage formed by hole 10a in the first membrane 17a, side passages formed by holes 11 and 10 respectively in the spacer sheets 1 forming the first spacer assembly 35a, membrane side passage formed by hole 10a in the second membrane 17b and conduit passages formed by holes 9 and 8 respectively in the spacer sheets forming the second spacer assembly 35b. The output conduit is similarly formed by side passages formed by hole 11a of membrane 17a, side passages formed by holes 10 and 11 of 35a, side passages formed by holes 11a of membrane 17b and conduit passages formed by holes 8 and 9 of assembly 35b.

Figure 5:
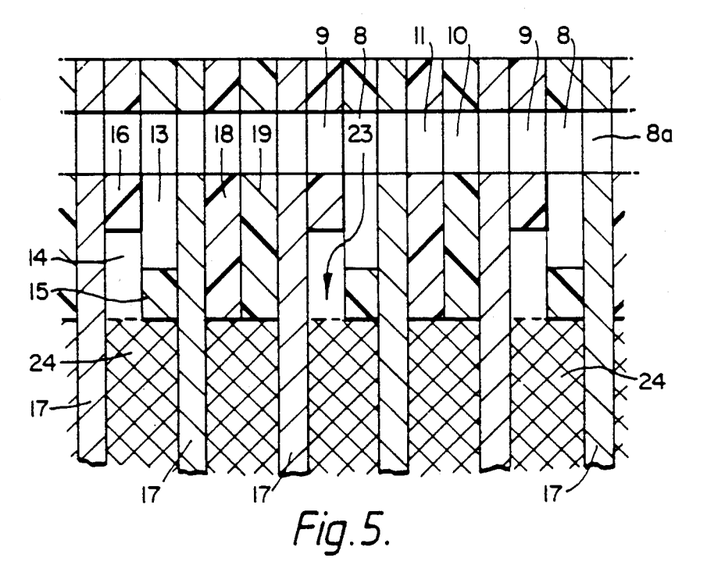
FIG. 5 is a cross-section through part of a membrane/spacer stack including a cross-section along line V—V of the spacer assembly shown in FIG. 2.

Liquid from the input and output streams is prevented from entering the chamber formed by the open centres 2a and 2b of the sheets of assembly 35a between membranes 17a and 17b by the solid bars 18 and 19 between the side passages formed by holes 10 and 11 and the open centres 2a and 2b. Liquid from the input stream enters the chamber formed by the open centres 2c and 2d of the sheets of spacer assembly 35b between membrane 17b and the adjacent membrane 17a (not shown) by way of the slots 13 and 14 as illustrated by arrow 23 in FIG. 5. The liquid passes through the chamber as indicated by arrows 36 and exits via the slots 14 and 13 along the opposite edge of the chamber by a route which is the reverse of that shown by arrow 23 in FIG. 5, and becomes part of the output stream.

The stack of membranes and spacers may be held together by retaining bolts passing through the holes 12 and 12a. The pressure exerted by the bolts seals the spacer sheets and membranes together along the flat continuous webs 18 to 21 of the spacer sheets to minimise leakage without the use of any adhesive. The stacks can be easily disassembled and reassembled to replace membranes if they become damaged.

The spacers illustrated may be adapted for use in systems having three or more streams by having higher polygonal spacers and membranes in which each stream utilises two sides, preferably opposite sides, of the polygon. A three-stream system could for instance have an acid, an alkali and a waste stream and would use hexagonal spacers and membranes.

The remainder of the construction of the cell will, apart from the novel spacer assembly, be conventional. Thus conventional membranes will be used for the particular dialysis, electrodialysis or other purpose intended and if the process is electrodialysis then appropriate electrodes and electrode compartments will be provided. It is generally preferred that each side of the cell should be from 300 mm to 3 m wide and for square cells as illustrated each side is normally from 300 to 1200 mm, often 500 or 1000 mm in width, most preferably about 500 mm. In practice therefore the number of slots 13 and 14 will usually be much greater than the number shown in the drawings.

The following example illustrates the invention.

Diluate solutions containing a 50/50 mix of monethylene glycol and sea water were desalinated using electrodialysis employing a cell utilising the arrangement of spacers and membranes illustrated in FIG. 7 and sea water as the concentrate fluid. The level of dissolved salts in the diluate solution varied between 30,000–40,000 ppm. These solutions were desalinated by recycling through the stack, at a flow rate of about 16 l/min, until the desired concentration of dissolved solids of below 300 ppm was attained. This indicated substantially no leakage since if there had been leakage the minimum level of desalting that could be achieved would be 1,500 ppm. Current efficiencies of between 80 and 90% were achieved with a voltage of 1.5 V per cell pair.

We claim:

1. A spacer assembly, for separating membranes of a fluid chamber in a fluid separation cell, said spacer assembly comprising a pair of spacer sheets (1) disposed in overlying coextensive relationship, and in which each spacer sheet (1) has sides surrounding an open centre (2) defining the sarea of the fluid chamber, conduit passages formed by holes (8, 9) in opposite sides of each spacer sheet (1), respectively, for supply and withdrawal of fluid to an associated cell and a plurality of slots (13, 14) arranged substantially uniformly along each of said opposite sides, each slot (13, 14) extending part way only between one of the conduit passages formed by holes (8, 9) and the open centre (2) and each slot having an open slot mouth (30) and a closed slot end distal from said open slot mouth, wherein the slot mouth (30) opens into either the open centre (2) or the respective conduit passage(s) formed by hole(s) (8), said slots (13, 14) being formed in said spacer sheet sides such that facing sides of adjacent slots define teeth (15, 16) that merge at said closed slot ends into a continuous web (20, 21), and in which the opposite sides of each spacer sheet (1) are in overlying relationship with each other so that the slots (14) in one sheet (1) which have their mouths (30) opening into the open centre (2) cooperate with the slots (13) in the other sheet having their mouths (30) opening into the respective conduit passage(s) formed by hole(s) (8) to provide a continuous fluid passage between the conduit passages formed by holes (8, 9) and the open centre (2), in which:

the conduit passages formed by holes (8, 9) comprise a supply conduit passage and a withdrawal conduit passage extending along said opposite sides of the spacer sheet (1) and across substantially an entire width of the open centre (2), the slots (13, 14) are distributed substantially uniformly across a width of each conduit passage, a ratio of a width of the mouth (30) of each slot to a thickness of each spacer sheet (1) being in a range of 0.2:1 to 5:1, and at least some of the slots (13, 14) have a widened closed slot end, the width of said widened closed slot end, transverse to the longitudinal axis of said slot, being greater than the corresponding width of said slot mouth and in which substantially all of the slots (13, 14) which do not have said widened closed slot end in one sheet cooperate with a slot (13, 14) which does have said widened closed slot end in the other sheet such that the cooperating slots (13, 14) which do not have said widened closed slot end overlap with said widened closed slot ends of the slots (13, 14) that do have said widened closed slot ends.

2. A spacer assembly according to claim 1 in which substantially all the slots (13, 14) have widened closed slot ends.

3. A spacer assembly according to claim 1 or claim 2, wherein the closed slot ends of said slots having widened closed slot ends are widened on both sides of the respective mouths.

4. A spacer assembly according to claim 3, in which a ratio of a width of the closed slot ends of the slots (13, 14) which have said widened closed slot end to the width of the mouth (30) of the slots (13, 14) which have said widened closed slot end is in a range of from 1.2:1 to 5.0:1.

5. A spacer assembly according to claim 4, in which the ratio of the width of the closed slot ends of the slots (13, 14) which have said widened closed slot end to the width of the mouth (30) of the slots (13, 14) which have said widened closed slot end is in the range of from 1.5:1 to 3.0:1.

6. A spacer assembly according to claim 3, wherein the slots (13, 14) which have a widened closed slot end are triangular, keyhole, or T-shaped.

7. A spacer assembly according to claim 1 in which a width of the closed slot ends of the slots (13, 14) that have widened closed slots ends is greater than a width of the teeth (15, 16) between the sides of adjacent slots.

8. A spacer assembly according to claim 1 in which the width of each slot mouth (30) is in the range 0.5 to 3 mm and each spacer sheet (1) has a thickness in the range 0.5 to 3 mm.

9. A spacer assembly according to claim 1 in which the ratio of the width of the mouth (30) of each slot (13), (14) to the thickness of each spacer sheet (1) is in the range of 0.3:1 to 2:1.

10. A spacer assembly according to claim 1 in which each spacer sheet (1) has the shape of a regular polygon having an even number of sides and in which the sides not having conduit passages (formed by holes (8, 9) are provided with side passages formed by holes (10, 11) of substantially the same dimensions and positions in their respective sides as the conduit passages formed by holes (8, 9).

11. A spacer assembly according to claim 10, in which each spacer sheet (1) is square.

12. A spacer assembly according to claim 1 which is formed from a thermoplastics sheet material.

13. A spacer assembly according to claim 12, wherein said thermoplastic sheet material is a polyolefin.

14. A spacer assembly according to claim 12, wherein said thermoplastic sheet material is a polymer of propylene.

15. A spacer assembly according to claim 1 in which the conduit passages formed by holes (8, 9) in each sheet (1) are each selected from two types of conduit passages, said types consisting of type 1 conduit passages formed by holes (8) characterized in that the slots (13) that are distributed along the type 1 conduit passages all have their mouths (30) opening into the type 1 conduit passage(s) and type 2 conduit passages formed by hole(s) (9) characterized in that the slots (14) that are distributed along the type 2 conduit passage(s) all have their mouths (30) opening into the open centre (2).

16. A spacer assembly according to claim 15 in which each spacer sheet (1) has a type 1 conduit passage and a type 2 conduit passage and a type 1 conduit passage in one sheet co-operates with a type 2 conduit passage in the other sheet.

17. A spacer assembly according to claim 15, wherein one of the conduit passages formed by holes (8, 9) in each spacer sheet (1) is a type 1 conduit passage and the other conduit passage is a type 2 conduit passage.

18. A spacer assembly according to claim 1 in which each spacer sheet (1) is substantially identical but is turned through 180° with respect to the other.

19. A fluid separation cell, comprising a stack of shallow chambers each of which is defined on its opposing faces by a membrane (17) and around its sides by a spacer assembly, in which the spacer assembly comprises a pair of spacer sheets (1) disposed in overlying coextensive relationship, and in which each spacer sheet (1) has sides surrounding an open centre (2) defining the area of the fluid chamber, conduit passages formed by holes (8, 9) in opposite sides of each spacer sheet (1), respectively, for supply and withdrawal of fluid to an associated cell and a plurality of slots (13, 14) arranged substantially uniformly along each of said opposite sides, each slot (13, 14) extending part way only between one of the conduit passages formed by holes (8, 9) and the open centre (2) and each slot having an open slot mouth (30) and a closed slot end distal from said open slot mouth, wherein the slot mouth (30) opens into either the open centre (2) or the respective conduit passage(s) formed by hole(s) (8), said slots (13, 14) being formed in said spacer sheet sides such that facing sides of adjacent slots define teeth (15, 16) that merge at said closed slot ends into a continuous web (20, 21), and in which the opposite sides of said spacer sheet (1) are in overlying relationship with each other so that the slots (14) in one sheet (1) which have their mouths (30) opening into the open centre (2) cooperate with the slots (13) in the other sheet having their mouths (30) opening into the respective conduit passage(s) formed by hole(s) (8) to provide a continuous fluid passage between the conduit passages formed by holes (8, 9) and the open centre (2), in which:

the conduit passages formed by holes (8, 9) comprise a supply conduit passage and a withdrawal conduit passage extending along said opposite sides of the spacer sheet (1) and across substantially an entire width of the open centre (2), the slots (13, 14) are distributed substantially uniformly across a width of each conduit passage, a ratio of a width of the mouth (30) of each slot to a thickness of each spacer sheet (1) being in a range of 0.2:1 to 5:1, and at least some of the slots (13, 14) have a widened closed slot end, the width of said widened closed slot end, transverse to the longitudinal axis of said slot, being greater than the corresponding width of said slot mouth (30), and in which substantially all of the slots (13, 14) which do not have said widened closed slot end in one sheet cooperate with a slot (13, 14) which does have said widened closed slot end in the other sheet such that the cooperating slots (13, 14) which do not have said widened closed slot end overlap with said widened closed slot ends of the slots (13, 14) that do have said widened closed slot ends.

20. A fluid separation cell according to claim 19 in which the spacer assemblies are square and are all substantially identical and the spacer assemblies in adjacent cell pairs are oriented at about 90° relative to each other and in which there are two fluid streams passing through the cell.

21. A fluid separation cell according to claim 19, which is a dialysis or electrodialysis cell.

22. A spacer sheet suitable for use in a spacer assembly having sides surrounding an open centre (2) defining the area of the fluid chamber, conduit passages formed by holes (8, 9) in opposite sides of each spacer sheet (1), respectively, for supply and withdrawal of fluid to an associated cell and a plurality of slots (13, 14) arranged substantially uniformly along each of said opposite sides, each slot (13, 14) extending part way only between one of the conduit passages formed by holes (8, 9) and the open centre (2) and each slot having an open slot mouth (30) and a closed slot end distal from said open slot mouth, wherein the slot mouth (30) opens into either the open centre (2) or the respective conduit passage(s) formed by hole(s) (8), said slots (13, 14) being formed in said spacer sheet sides such that facing sides of adjacent slots define teeth (15, 16) that merge at said closed slot ends into a continuous web (20, 21), in which:

the conduit passages formed by holes (8, 9) comprise a supply conduit passage and a withdrawal conduit passage extending along said opposite sides of the spacer sheet (1) and across substantially an entire width of the open centre (2), the slots (13, 14) are distributed substantially uniformly across a width of each conduit passage, a ratio of a width of the mouth (30) of each slot to a thickness of the spacer sheet (1) being in a range of 0.2:1 to 5:1, and at least some of the slots (13, 14) have a widened closed slot end, the width of said widened closed slot end, transverse to the longitudinal axis of said slot, being greater than the corresponding width of said slot mouth (30).

23. A spacer sheet according to claim 22, in which all of the slots (13, 14) are slots which have said widened closed slot ends.

* * * * *